United States Patent
Kyung et al.

(10) Patent No.: US 7,953,172 B2
(45) Date of Patent: May 31, 2011

(54) APPARATUS AND METHOD FOR TRANSMITTING/RECEIVING SIGNAL IN A COMMUNICATION SYSTEM

(75) Inventors: Gyu-Bum Kyung, Suwon-si (KR); Jae-Yoel Kim, Suwon-si (KR); Dong-Seek Park, Yongin-si (KR); Sung-Eun Park, Seoul (KR); Chi-Woo Lim, Suwon-si (KR); Hong-Sil Jeong, Seoul (KR); Seung-Hoon Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 954 days.

(21) Appl. No.: 11/725,977

(22) Filed: Mar. 20, 2007

(65) Prior Publication Data

US 2008/0037676 A1  Feb. 14, 2008

(30) Foreign Application Priority Data

Mar. 20, 2006  (KR) .......................... 10-2006-0025353

(51) Int. Cl.
*H04L 27/34* (2006.01)

(52) U.S. Cl. ........ 375/265; 375/295; 714/751; 714/752; 714/758; 714/784; 714/786; 714/801

(58) Field of Classification Search ............... 375/260, 375/267, 340, 347, 265, 295, 316; 714/751, 714/752, 758, 784, 786, 801
See application file for complete search history.

(56) References Cited

U.S. PATENT DOCUMENTS

| | | |
|---|---|---|
| 2003/0063587 A1 | 4/2003 | Cho et al. |
| 2006/0119494 A1 | 6/2006 | Na et al. |
| 2007/0237167 A1 | 10/2007 | Kaneko et al. |
| 2009/0132886 A1 * | 5/2009 | Oh et al. ............ 714/752 |

FOREIGN PATENT DOCUMENTS

| | | |
|---|---|---|
| KR | 1020030020158 | 3/2003 |
| KR | 1020040092915 | 11/2004 |
| KR | 1020050108509 | 11/2005 |
| KR | 1020070076047 | 7/2007 |

* cited by examiner

*Primary Examiner* — Leon Flores
(74) *Attorney, Agent, or Firm* — The Farrell Law Firm, P.C.

(57) ABSTRACT

Disclosed is an apparatus and method for transmitting/receiving a signal in a communication system, in which an MCS level or a modulation scheme to be used to an information vector to be transmitted is determined when the information vector is generated, and a codeword vector is generated by encoding the information vector in an encoding scheme corresponding to the determined MCS level or modulation scheme. Thus, a signal can be transmitted in such a manner as to have optimal performance for each MCS level or modulation scheme.

10 Claims, 4 Drawing Sheets

APPARATUS AND METHOD FOR TRANSMITTING/RECEIVING SIGNAL IN A COMMUNICATION SYSTEM

PRIORITY

This application claims priority under 35 USC§119 to an application filed in the Korean Industrial Property Office on Mar. 20, 2006 and assigned Serial No. 2006-025353, the contents of which are incorporated herein by reference.

BACKGROUND OF THE INVENTION

1. Field of the Invention

The present invention relates to an apparatus and method for transmitting/receiving a signal in a communication system, and more particularly to an apparatus and method for transmitting/receiving a signal in a manner corresponding to a modulation scheme in a communication system.

2. Description of the Related Art

Next-generation communication systems have evolved into packet service communication system for transmitting burst packet data to a plurality of Mobile Stations (MSs), and the packet service communication system has been designed to be suitable for mass data transmission. Particularly, next-generation communication systems have proposed various schemes for increasing the amount of data transmitted, such as a Hybrid Automatic Repeat Request (HARQ) scheme, an Adaptive Modulation and Coding (AMC), etc. Further, developers of next-generation communication systems are actively considering using Low Density Parity Check (LDPC) as a channel code, together with turbo code. The LDPC code is known to have a good performance gain at high-speed data transmission, and is advantageous in that it can enhance data transmission reliability by effectively correcting errors caused by noise occurring in a transmission channel.

Examples of next-generation communication systems actively considering the use of the LDPC code include the Institute of Electrical and Electronics Engineers (IEEE) 802.16e communication system, the IEEE 802.11n communication system, etc. The IEEE 802.16e and IEEE 802.11n communication systems also employ the various schemes such as AMC, etc. to increase the amount of data transmission. However, in employing the AMC scheme, they present no concrete way to use a channel code, such as the LDPC code or the like.

SUMMARY OF THE INVENTION

Accordingly, the present invention has been made to solve at least the above-mentioned problems occurring in the prior art, and the present invention provides an apparatus and method for transmitting/receiving a signal in a communication system.

Further, the present invention provides an apparatus and method for transmitting/receiving a signal in a manner corresponding to a modulation scheme in a communication system.

In accordance with an aspect of the present invention, there is provided an apparatus for transmitting a signal in a communication system, the apparatus includes a controller for determining a Modulation and Coding Scheme (MCS) level or a modulation scheme to be used to an information vector to be transmitted, when the information vector is generated, and determining an encoding scheme corresponding to the determined MCS level or modulation scheme; and an encoder for encoding the information vector by using the encoding scheme determined by the controller to thereby generate a codeword vector.

In accordance with another aspect of the present invention, there is provided an apparatus for receiving a signal in a communication system, the apparatus includes a demodulator for demodulating a reception vector using a demodulation scheme to thereby generate a demodulation vector; a controller for determining a decoding scheme for application to the demodulation vector; and a decoder for decoding the demodulation vector using the decoding scheme determined by the controller to thereby generate the restored information vector.

In accordance with yet another aspect of the present invention, there is provided a method of transmitting a signal by a signal transmission apparatus in a communication system, the method includes determining an MCS level or a modulation scheme to be applied to an information vector to be transmitted, when the information vector is generated; and encoding the information vector by using an encoding scheme corresponding to the determined MCS level or modulation scheme to thereby generate a codeword vector.

In accordance with yet another aspect of the present invention, there is provided a method of receiving a signal by a signal reception apparatus in a communication system, the method includes demodulating a reception vector using a demodulation scheme to thereby generate a demodulation vector; determining a decoding scheme for application to the demodulation vector; and decoding the demodulation vector using the decoding scheme to thereby generate a restored information vector.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENT

Figure 1:
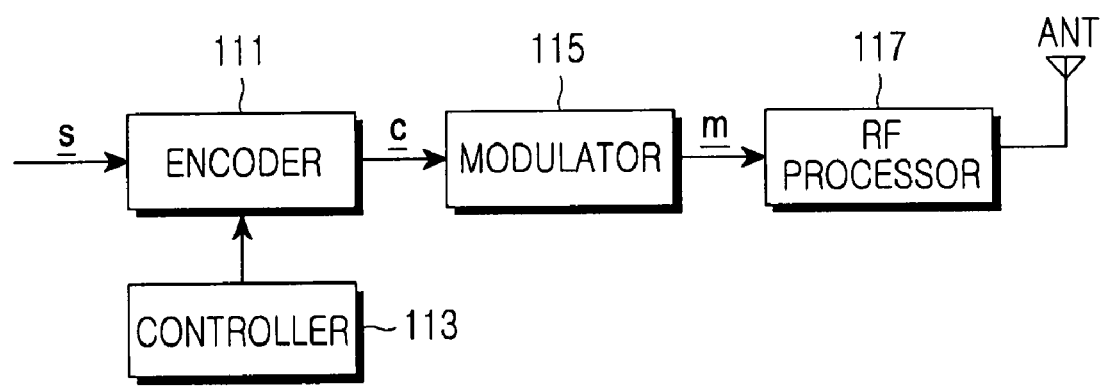
FIG. 1 is a block diagram illustrating the structure of an IEEE 802.11n common communication system compliant signal transmission apparatus according to the present invention.

Exemplary embodiments of the present invention will be described with reference to the accompanying drawings. It should be noted that similar components are designated by similar reference numerals although they are illustrated in different drawings. Also, in the following description, detailed description of known functions and configurations incorporated herein will be omitted when it may obscure the subject matter of the present invention. Further, it should be noted that only parts essential for understanding the operations of the present invention will be described and a description of non-essential parts will be omitted in order not to obscure the present invention.

The present invention proposes an apparatus and method for transmitting/receiving a signal using a modulation scheme in a communication system. For the purpose of explanation, the communication system will be assumed to be a communication system using an Low Density Parity Check (LDPC) code as a channel code, including an Institute of Electrical and Electronics Engineers (IEEE) 802.16e communication system and the IEEE 802.11n communication system. Particularly, the following description is based on the IEEE 802.11n communication system by way of example.

Similar to other next-generation communication systems, the IEEE 802.11n communication system employs the various schemes such as an Adaptive Modulation and Coding (AMC) scheme. in order to increase the amount of data transmitted. The developers of IEEE 802.11n communication system are also actively considering using LDPC code as a channel code, which is known to have good performance gain at high-speed data transmission, and can advantageously enhance data transmission reliability by effectively correcting errors caused by noise occurring in a transmission channel. However, at the present time in employing the AMC scheme, the IEEE 802.11n communication system presents no concrete way to use a channel code, such as the LDPC code. Therefore, the present invention provides an apparatus and method for using a channel code such as the LDPC code, in employing the AMC scheme, and reference will now be made in detail thereto.

Referring to FIG. 1, the signal transmission apparatus includes an encoder 111, a controller 113, a modulator 115 and an RF (Radio Frequency) processor 117.

If an information vector 's' to be transmitted is generated, the information vector 's' is transferred to encoder 111. Encoder 111 generates a codeword vector 'c' by encoding the information vector 's' in a predetermined encoding scheme under the control of controller 113, and then outputs the generated codeword vector 'c' to modulator 115. Here, the predetermined encoding scheme refers to a scheme for encoding the information vector 's' using a parity check matrix selected under the control of controller 113. The operation of controller 113 will now be described in detail.

Encoder 111 stores parity matrixes of LDPC codes, each showing optimal performance for each Modulation and Coding Scheme (MCS) level applicable in the IEEE 802.11n communication system. The MCS level is a level defined by a modulation scheme in combination with a coding rate. The parity check matrixes of LDPC codes, each showing optimal performance for each MCS level, may be the same or different. When parity check matrixes among the parity matrixes of LDPC codes are the same, each showing optimal performance for each MCS level, encoder 111 only has to store one parity check matrix for the same parity check matrixes, so long as it stores a mapping relation between the parity matrix and corresponding MCS levels.

Controller 113 determines an MCS level for use in the signal transmission apparatus, and outputs a parity check matrix selection signal to encoder 111 so that encoder 111 uses a parity check matrix corresponding to the determined MCS level. Then, encoder 111 selects a parity check matrix corresponding to the parity check matrix selection signal output from controller 111, from among the parity check matrixes stored corresponding to the respective MCS levels, generates a codeword vector 'c' by encoding information vector 's' using the selected parity check matrix, and then outputs the generated codeword vector 'c' to modulator 115. In the foregoing, the control operation of controller 113 has been described by exemplifying the case where encoder 111 stores parity matrixes of LDPC codes, each showing optimal performance for each MCS level applicable in the IEEE 802.11n communication system. Unlike the previous operation, encoder 111 may store parity matrixes of LDPC codes, each showing optimal performance for each of all modulation schemes applicable in the IEEE 802.11n communication system.

In the case where encoder 111 stores parity matrixes of LDPC codes, each showing optimal performance for each of all modulation schemes applicable in the IEEE 802.11n communication system, controller 113 operates as follows:

Encoder 111 stores parity matrixes of LDPC codes, each showing optimal performance for each of all modulation schemes applicable in the IEEE 802.11n communication system. The parity check matrixes of LDPC codes, each showing optimal performance for each of the modulation schemes, may be the same or different. When parity check matrixes among the parity matrixes of LDPC codes are the same, each showing optimal performance for each of the modulation schemes, encoder 111 only has to store one parity check matrix for the same parity check matrixes, so long as it stores a mapping relation between the parity matrix and corresponding MCS levels.

Controller 113 determines an MCS level for use in the signal transmission apparatus, and outputs a parity check matrix selection signal to encoder 111 so that encoder 111 uses a parity check matrix corresponding to the determined MCS level. Then, encoder 111 selects a parity check matrix corresponding to the parity check matrix selection signal output from controller 111, from among the parity check matrixes stored corresponding to the respective modulation schemes, generates a codeword vector 'c' by encoding the information vector 's' using the selected parity check matrix, and then outputs the generated codeword vector 'c' to modulator 115.

Modulator 115 generates a modulation vector 'm' by modulating the codeword vector 'c' in a predetermined modulation scheme, and then outputs the generated modulation vector 'm' to RF processor 117. RF processor 117 inputs the modulation vector 'm' output from modulator 115, conducts RF processing for the input modulation vector 'm', and then transmits the RF-processed modulation vector 'm' to a signal reception apparatus through an antenna.

Next, reference will be made to the structure of a signal reception apparatus in the IEEE 802.11n communication system according to the present invention, with reference to FIG. 2.

Figure 2:
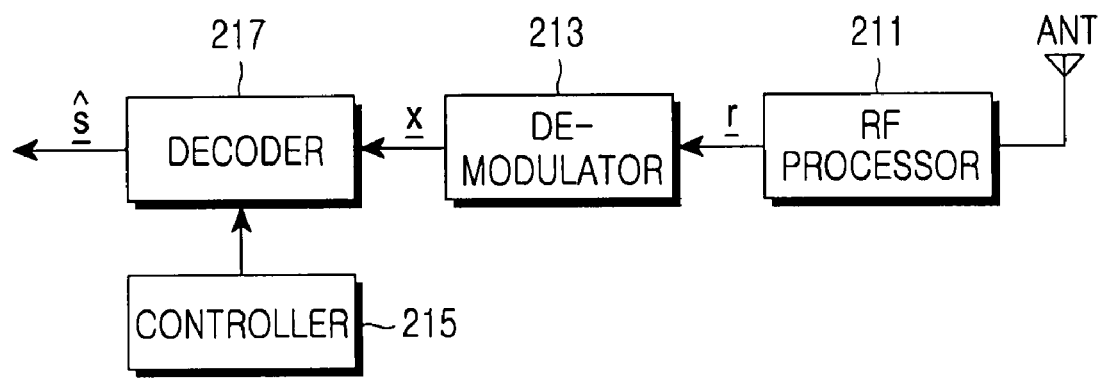
FIG. 2 is a block diagram illustrating the structure of an IEEE 802.11n communication system compliant signal reception apparatus according to the present invention.

Referring to FIG. 2, the signal reception apparatus includes an RF processor 211, a demodulator 213, a controller 215 and a decoder 217. A signal transmitted from a signal transmission apparatus corresponding to the signal reception apparatus is received through an antenna of the signal reception apparatus, and the received signal is transferred to RF processor 211. RF processor 211 conducts RF processing for the received signal to thereby generate a reception vector 'r', and then outputs the generated reception vector 'r' to demodulator 213. Demodulator 213 inputs the reception vector 'r' output from RF processor 211, generates a demodulation vector 'x' by demodulating the input reception vector 'r' in a demodulation scheme corresponding to a modulation scheme applied in a modulator of the signal transmission apparatus, that is, above-mentioned modulator 115, and then outputs the generated demodulation vector 'x' to decoder 217. Decoder 217 inputs the demodulation vector 'x' output from demodulator 213, decodes the input demodulation vector 'x' in a decoding scheme corresponding to an encoding scheme applied in an encoder of the signal transmission apparatus, that is, above-mentioned encoder 111, under the control of controller 215, and then outputs the decoded demodulation vector 'x' into a finally restored information vector 'ŝ'. Here, the decoding scheme is a decoding scheme corresponding to an encoding scheme applied in an encoder of the signal transmission apparatus, and refers to a scheme for inputting the demodulation vector 'x' output from demodulator 213, and generates a restored information vector 'ŝ' using a parity check matrix selected under the control of controller 215. The operation of controller 215 will now be described in detail.

Decoder 217 stores parity matrixes of LDPC codes, each showing optimal performance for each MCS level applicable in the IEEE 802.11n communication system. The parity check matrixes of LDPC codes, each showing optimal performance for each MCS level, stored in decoder 217, are the same as those stored in encoder 111.

Controller 215 determines an MCS level used in the signal transmission apparatus, and outputs a parity check matrix selection signal to decoder 217 so that decoder 217 uses a parity check matrix corresponding to the determined MCS level. With regard to this, controller 215 can detect the MCS level used in the signal transmission apparatus through a separate control message, etc. Then, decoder 217 selects a parity check matrix corresponding to the parity check matrix selection signal output from controller 215, from among the stored parity check matrixes corresponding to the respective MCS levels, and generates a restored information vector 'ŝ' by decoding the demodulation vector x output from demodulator 213 using the selected parity check matrix. In the foregoing, the control operation of controller 215 has been described by exemplifying the case where decoder 217 stores parity matrixes of LDPC codes, each showing optimal performance for each MCS level applicable in the IEEE 802.11n communication system. Unlike the previous operation, decoder 217 may store parity matrixes of LDPC codes, each showing optimal performance for each of all modulation schemes applicable in the IEEE 802.11n communication system.

In the case where decoder 217 stores parity matrixes of LDPC codes, each showing optimal performance for each of all modulation schemes applicable in the IEEE 802.11n communication system, controller 215 operates as follows:

Decoder 217 stores parity matrixes of LDPC codes, each showing optimal performance for each of all modulation schemes applicable in the IEEE 802.11n communication system. The parity check matrixes of LDPC codes, each showing optimal performance for each of the modulation schemes, stored in decoder 217, are the same as those stored in encoder 111.

Controller 215 determines a modulation scheme used in the signal transmission apparatus, and outputs a parity check matrix selection signal to decoder 217 so that decoder 217 uses a parity check matrix corresponding to the determined modulation scheme. Then, decoder 217 selects a parity check matrix corresponding to the parity check matrix selection signal output from controller 215, from among the parity check matrixes stored corresponding to the respective modulation schemes, and generates a restored information vector 'ŝ' by decoding the demodulation vector x output from the demodulator 213 using the selected parity check matrix.

Reference will now be made to an operation of transmitting a signal by a signal transmission apparatus in the IEEE 802.11n communication system according to the present invention.

Figure 3:
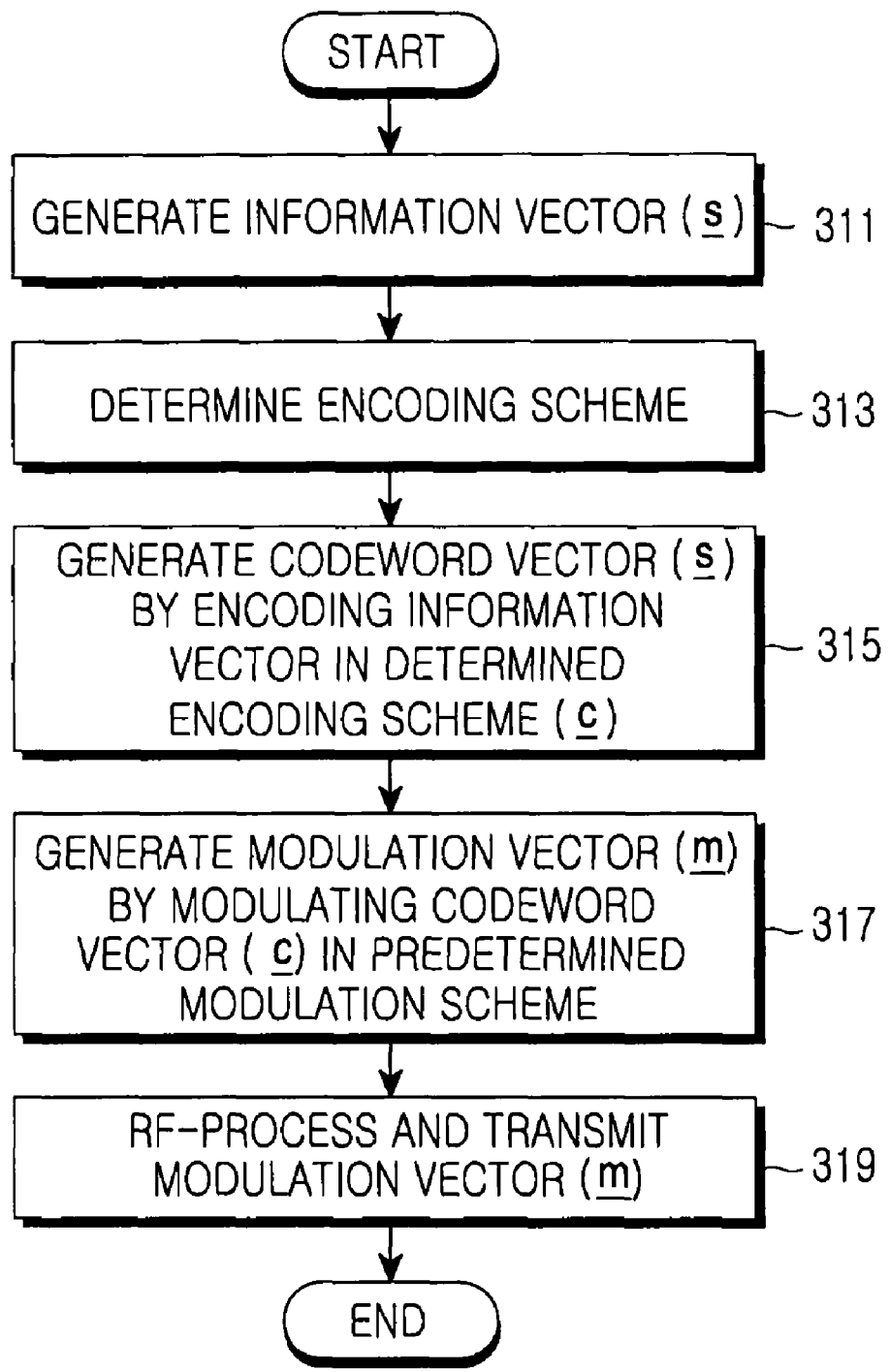
FIG. 3 is a flowchart of an operation of transmitting a signal by an IEEE 802.11n communication system compliant signal transmission apparatus according to the present invention.

Referring to FIG. 3, the signal transmission apparatus detects in step 311 that an information 's' is generated, it proceeds to step 313. In step 313, the signal transmission apparatus determines the appropriate encoding scheme for the information vector 's', and proceeds to step 315. The encoding scheme is determined in a manner as already described with reference to FIG. 1, so a detailed description will be omitted.

In step 315, the signal transmission apparatus generates a codeword vector 'c' by encoding the information vector 's' using the determined encoding scheme, and then proceeds to step 317. In step 317, the signal transmission apparatus generates a modulation vector 'm' by modulating the codeword vector 'c' in a predetermined modulation scheme, and then proceeds to step 319. In step 319, the signal transmission apparatus conducts RF processing for the modulation vector 'm', transmits the processed modulation vector 'm' to a signal reception apparatus, and then ends the signal transmission operation.

Next, reference will be made to an operation of receiving a signal by a signal reception apparatus in the IEEE 802.11n communication system according to the present invention.

Figure 4:
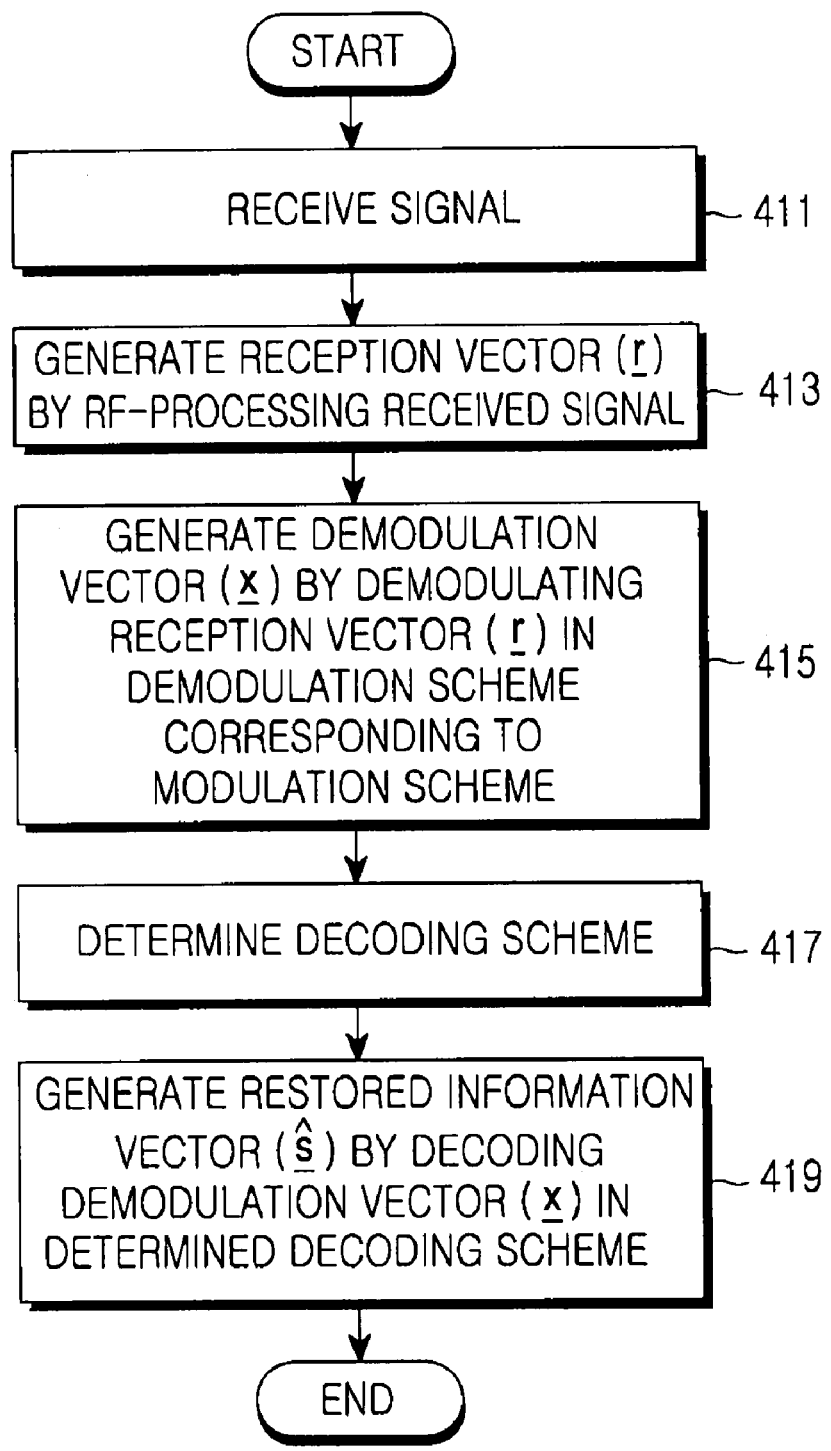
FIG. 4 is a flowchart of an operation of receiving a signal by an IEEE 802.11n communication system compliant signal reception apparatus in according to the present invention.

Referring to FIG. 4, in step 411, the signal reception apparatus receives a signal, which is transmitted from a signal transmission apparatus, through an antenna, and proceeds to step 413. In step 413, the signal reception apparatus conducts RF processing for the received signal to thereby generate a reception vector 'r', and then proceeds to step 415. In step 415, the signal reception apparatus generates a demodulation vector 'x' by demodulating the reception vector 'r' in a demodulation scheme corresponding to a modulation scheme applied in the signal transmission apparatus, and proceeds to step 417. In step 417, the signal reception apparatus determines a decoding scheme in such a manner as to correspond to an encoding scheme applied in the signal transmission apparatus, and then proceeds to step 419. The decoding scheme is determined as previously described with reference to FIG. 2, so a detailed description thereof will be omitted. In step 419, the signal reception apparatus generates a restored information vector 'ŝ' by decoding the demodulation vector 'x' using the determined decoding scheme, and then ends the signal reception operation.

Reference will now be made to a coding gain that can be obtained when a signal is transmitted/received corresponding to the modulation scheme of IEEE 802.11, with reference to FIG. 5.

Figure 5:
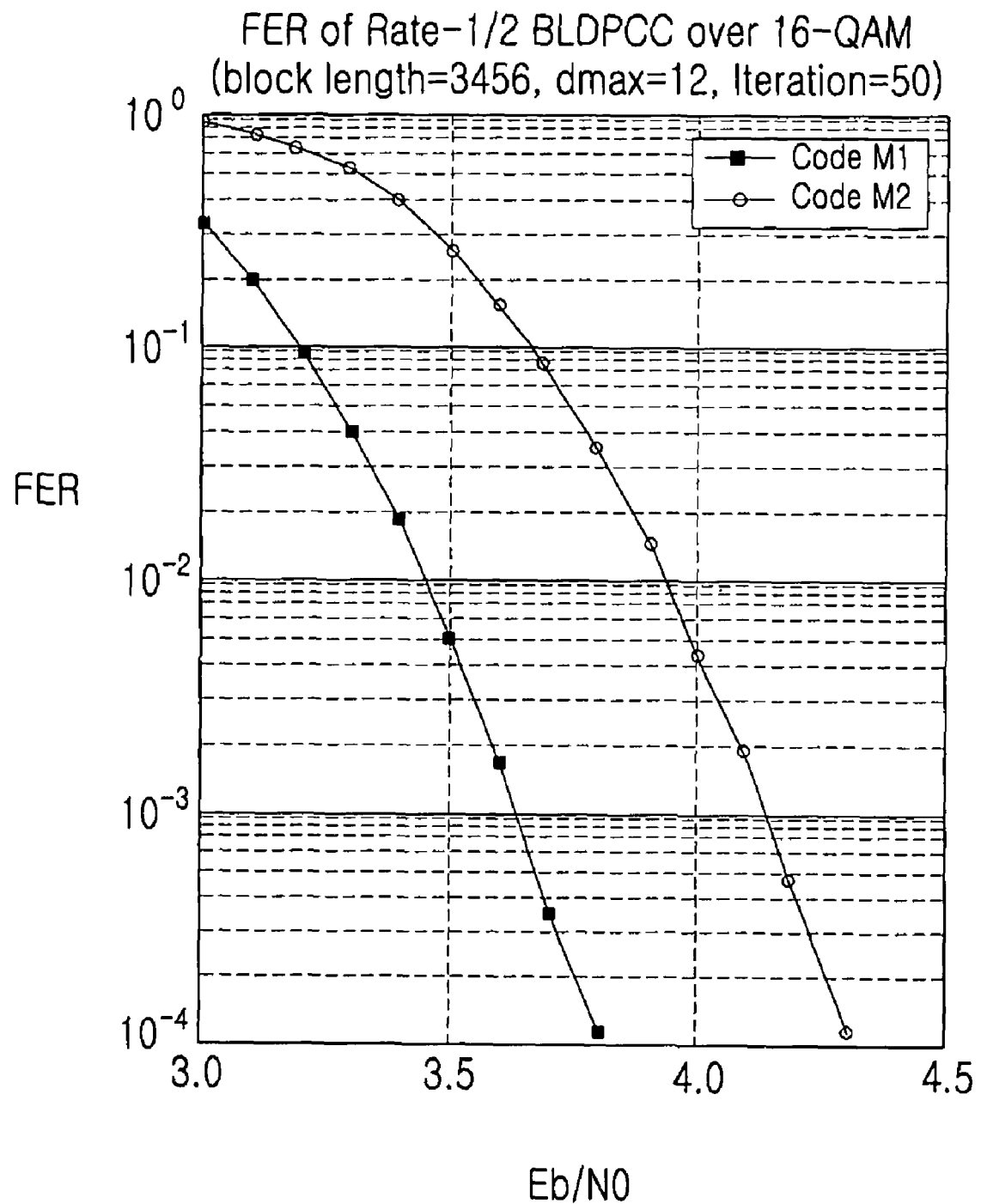
FIG. 5 is a graph illustrating the coding gain obtained when a signal is transmitted/received corresponding to an IEEE 802.11n communication system compliant modulation scheme according to the present invention.

Among the curves illustrated in FIG. 5, Code M1 represents an LDPC code which has an optimized degree of distribution when a 16 QAM (Quadrature Amplitude Modulation) scheme is employed, and Code M2 represents an LDPC code which has an optimized degree of distribution when a BPSK (Binary Phase Shift Keying) scheme is employed. It can be noted from FIG. 5 that Code M1, that is, the LDPC code having an optimized degree of distribution when a 16 QAM scheme is employed, makes it possible to obtain a coding gain higher by about 0.5 dB than that for Code M2, that is, the LDPC code having an optimized degree of distribution when a BPSK scheme is employed. In this way, when a signal is transmitted/received using a modulation scheme compliant to IEEE 802.11n communication system, that is, when LDPC codes, each of which is optimized for each MCS level, are used, as proposed herein, it is possible to obtain a coding gain.

As describe above, according to the present invention, parity check matrixes of channel codes, for example, LDPC codes, each showing optimal performance for each of MCS levels or modulation schemes applicable in a communication system, are predetermined, and subsequently an information vector is encoded using a parity check matrix corresponding to a specific MCS level or modulation scheme when the information vector is transmitted in the communication system, so that a channel code having optimal performance for each MCS level or modulation scheme can be generated.

While the invention has been shown and described with reference to certain exemplary embodiments thereof, it will be understood by those skilled in the art that various changes in form and details may be made therein without departing from the spirit and scope of the invention as further defined by the appended claims.

What is claimed is:

1. A method for transmitting a signal by a signal transmission apparatus in a communication system, the method comprising:
   determining, by the signal transmission apparatus, a Modulation and Coding Scheme (MCS) level or a modulation scheme to be used for an information vector to be transmitted;
   encoding, by the signal transmission apparatus, the information vector by using an encoding scheme corresponding to the determined MCS level or modulation scheme to thereby generate a codeword vector; and
   storing only one of identical parity check matrixes and a mapping relation between the one parity check matrix and corresponding MCS levels or modulation schemes, when any parity check matrixes of a Low Density Parity Check (LDPC) codes are identical,
   wherein the encoding scheme generates an LDPC code exhibiting optimal performance for each MCS level or modulation scheme utilized in the communication system and corresponds to a scheme for encoding the information vector using a parity check matrix from among a plurality of parity check matrixes of the LDPC code exhibiting optimal performance for each MCS level or modulation scheme.

2. The method as claimed in claim 1, further comprising modulating the codeword vector using the MCS level or modulation scheme to thereby generate a modulation vector, and transmitting the modulation vector.

3. The method as claimed in claim 1, wherein the encoding scheme is predetermined for each MCS level or modulation scheme, utilized the communication system.

4. A method for receiving a signal by a signal reception apparatus in a communication system, the method comprising:
   demodulating, by the signal reception apparatus, a reception vector using a demodulation scheme to thereby generate a demodulation vector;
   determining, by the signal reception apparatus, a decoding scheme to be used for the demodulation vector, the decoding scheme corresponding to an encoding scheme applied in a signal transmission apparatus corresponding to the signal reception apparatus;
   decoding, by the signal reception apparatus, the demodulation vector using the decoding scheme to thereby generate a restored information vector; and
   storing only one of identical parity check matrixes and a mapping relation between the one parity check matrix and corresponding MCS levels or modulation schemes, when any parity check matrixes of a Low Density Parity Check (LDPC) codes are identical,
   wherein the encoding scheme generates an LDPC code exhibiting optimal performance for each Modulation and Coding Scheme (MCS) level or modulation scheme utilized in the communication system and corresponds to a scheme for encoding the information vector using a parity check matrix from among a plurality of parity check matrixes of the LDPC code exhibiting optimal performance for each MCS level or modulation scheme.

5. The method as claimed in claim 4, wherein the encoding scheme is predetermined for each MCS level or modulation scheme utilized in the communication system.

6. An apparatus for transmitting a signal in a communication system, the apparatus comprising:
   a controller for determining a Modulation and Coding Scheme (MCS) level or a modulation scheme for to be used for an information vector to be transmitted, when the information vector is generated, and determining an encoding scheme corresponding to the determined MCS level or modulation scheme;
   an encoder for encoding the information vector by using the encoding scheme determined by the controller to thereby generate a codeword vector, and storing only one of identical parity check matrixes and a mapping relation between the one parity check matrix and corresponding MCS levels or modulation schemes, when any parity check matrixes of a Low Density Parity Check (LDPC) codes are identical,
   wherein the encoding scheme generates an LDPC code exhibiting optimal performance for each MCS level or modulation scheme utilized in the communication system and corresponds to a scheme for encoding the information vector using a parity check matrix from among a plurality of parity check matrixes of the LDPC code exhibiting optimal performance for each MCS level or modulation scheme.

7. The apparatus as claimed in claim 6, further comprising:
   a modulator for modulating the codeword vector using the determined MCS level or modulation scheme to thereby generate a modulation vector.

8. The apparatus as claimed in claim 6, wherein the encoding scheme is predetermined for each MCS level or modulation scheme utilized in the communication system.

9. An apparatus for receiving a signal in a communication system, the apparatus comprising:
   a demodulator for demodulating a reception vector using a demodulation scheme to thereby generate a demodulation vector;
   a controller for determining a decoding scheme to be used for the demodulation vector, the decoding scheme corresponding to an encoding scheme applied in a signal transmission apparatus corresponding to the signal reception apparatus; and
   a decoder for decoding the demodulation vector using the decoding scheme determined by the controller to thereby generate a restored information vector, and storing only one of identical parity check matrixes and a mapping relation between the one parity check matrix and corresponding MCS levels or modulation schemes, when any parity check matrixes of a Low Density Parity Check (LDPC) codes are identical,
   wherein the encoding scheme generates an LDPC code exhibiting optimal performance for each Modulation and Coding Scheme (MCS) level or modulation scheme utilized in the communication system and corresponds to a scheme for encoding the information vector using a parity check matrix from among a plurality of parity check matrixes of the LDPC code exhibiting optimal performance for each MCS level or modulation scheme.

10. The apparatus as claimed in claim 9, wherein the encoding scheme is predetermined for each MCS level or modulation scheme utilized in the communication system.

* * * * *